United States Patent [19]

Kaun

[11] 4,446,212

[45] May 1, 1984

[54] ELECTROCHEMICAL CELL

[75] Inventor: Thomas D. Kaun, New Lenox, Ill.

[73] Assignee: The United States of America as represented by the United States Department of Energy, Washington, D.C.

[21] Appl. No.: 440,203

[22] Filed: Nov. 8, 1982

Related U.S. Application Data

[63] Continuation-in-part of Ser. No. 287,857, Jul. 29, 1981, Pat. No. 4,358,513.

[51] Int. Cl.³ .............................................. H01M 4/36
[52] U.S. Cl. ................................... 429/103; 429/112; 429/221
[58] Field of Search ...................... 429/103, 112, 221

[56] References Cited

U.S. PATENT DOCUMENTS

| | | | |
|---|---|---|---|
| 3,607,413 | 9/1971 | Buzzelli | 136/76 |
| 3,725,132 | 4/1973 | Moser et al. | 429/112 |
| 3,957,532 | 5/1976 | Settle et al. | 136/75 |
| 4,011,372 | 3/1977 | Tomczuk et al. | 429/218 |
| 4,086,396 | 4/1978 | Mathers et al. | 429/112 X |
| 4,158,720 | 6/1979 | Kaun | 429/221 X |
| 4,324,846 | 4/1982 | Kaun et al. | 429/112 |

Primary Examiner—Charles F. Lefevour
Attorney, Agent, or Firm—Charles F. Lind; Robert J. Fisher; Michael F. Esposito

[57] ABSTRACT

An improved secondary electrochemical cell is disclosed having a negative electrode of lithium aluminum, a positive electrode of iron sulfide, a molten electrolyte of lithium chloride and potassium chloride, and the combination that the fully charged theoretical capacity of the negative electrode is in the range of 0.5–1.0 that of the positive electrode. The cell thus is negative electrode limiting during discharge cycling. Preferably, the negative electrode contains therein, in the approximate range of 1–10 volume % of the electrode, an additive from the materials of graphitized carbon, aluminum-iron alloy, and/or magnesium oxide.

17 Claims, 5 Drawing Figures

ELECTROCHEMICAL CELL

The United States Government has rights in this invention pursuant to Contract No. W-31-109-ENG-38 between the U.S. Department of Energy and the University of Chicago representing Argonne National Laboratory.

This invention is a continuation-in-part of my copending application Ser. No. 287,857 entitled "Electrochemical Cell and Negative Electrode Therefor" filed July 29, 1981 now U.S. Pat. No. 4,358,513.

BACKGROUND OF THE INVENTION

The above mentioned copending application relates to a high performance secondary electrochemical battery or cell particularly having a negative electrode of a lithium-aluminum alloy and an additive of graphitized carbon or Raney iron, the composite electrode exhibiting increased capacity and lithium-alloy utilization when compared to a lithium-alloy electrode without the additive.

In prior developed high temperature secondary electrochemical cells, the positive electrode generally has been formed with calcogens such as sulfur, oxygen, selenium or tellurium, as well as their transition metal chalcogenides: while the positive electrode materials have included the sulfides of iron, cobalt, nickel and copper.

In high temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal, that is lithium. In cells operating at moderate temperatures, aqueous and organic base electrolytes are permissible and these also can include cations of the negative electrode metal.

Alkali metals such as lithium, sodium, potassium or alkaline earth metals including calcium, magnesium, etc. and alloys of these materials are contemplated as negative electrode reactants. Alloys of these materials such as lithium-aluminum, lithium-silicon, lithium-magnesium, calcium-magnesium, calcium-aluminum, calcium-silicon and magnesium-aluminum have been investigated to maintain the negative electrode in solid form and thereby improve retention of the active material at the high operating temperatures of the cell.

One of the disadvantages of previous lithium-aluminum electrodes, has been the reduction in cell capacity during prolonged operation. The reduced capacity has been accepted in order to obtain the enhanced electrode and cell stability afforded by solid lithium alloys. In the lithium-aluminum negative electrode, postoperative examination of long-lived cells have revealed high lithium concentrations at the negative electrode face and agglomeration of lithium aluminum (Li-Al) particles in the porous electrode.

The basic lithium-aluminum/iron-sulfide battery has the negative electrode formed of a lithium-aluminum alloy while the positive electrode is formed of iron sulfide (FeS or $Fe_2S$). An electrolyte comprised of blended lithium chloride and potassium chloride (LiCl, KCl) encompasses both electrodes and the space intervening. During charging of the battery, a chemical reaction provides that lithium plus an electron migrate toward the negative electrode to form lithium aluminum, while iron and lithium sulfide less an electron form iron sulfate in the positive electrode. The discharge cycle conversely provides that lithium ions migrate towards the positive electrode and react with the iron-sulfide to form lithium sulfide ($Li_2S$) and iron.

The lithium aluminum/iron sulfide electrochemical battery is being proposed for use with electric vehicles where a specific high power level is needed as well as where repeated charge and deep discharge cycles will take place (up to perhaps 75–90% depth of discharge). With this deep discharge, the internal resistance of each battery cell increases dramatically to reduce the output power up to 40–60% when compared to the fully charged condition.

In analyzing this phenomenon, the internal resistance of the positive electrode at 75–90% depth of discharge has been noted to increase to three times that at the fully charged condition; while the internal resistance of the negative electrode at the same 75%–90% depth of discharge has been noted to increase by 20–30% compared to the fully charged condition. Furthermore, the positive electrode discharges to a greater percentage of the full capacity potential even after many repeated charge/discharge cycles; whereas the maximum potential capacity of the negative electrode drops off slightly for each charge/discharge cycle so that after the same number of such cycles, the effective fully charged potential capacity of the negative electrode might be only 75% of that when brand new. This repetitive deep discharge cycling of the negative electrodes thus incrementally reduces the overall capacity of the cell, or of a battery in a multiple cell hook-up.

For these reasons and others, the design strategy in a lithium-aluminum/iron-sulfide battery has been to make the negative electrode of significantly greater capacity than the capacity of the corresponding positive electrode, so that during the deep discharge conditions of the positive electrode, the negative electrode yet has ample reserve capacity remaining. This might be typified by a positive electrode having a design capacity of perhaps 250–275 amp. hrs. and a negative electrode having a design capacity of 325–360 amp. hrs; whereby the negative electrode has 10–25% overcapacity compared to the positive electrode and the battery is classified as a positive electrode limited design.

The above referred to copending application Ser. No. 287,857 disclosed that the addition of a small amount of graphited carbon or Raney iron (the intermetallic $Al_5Fe_2$), or mixtures thereof, to the lithium-aluminum electrode unexpectedly increased the cell capacity and stability over multiple deep discharges and significantly increased the lithium aluminum uitilization.

The graphitized carbon, as referred to herein, is particulate carbon which is heated in a protective atmosphere to a temperature in the range of about 1000–2000° C. in order to initiate the change to graphite structure. Higher heating temperatures are possible and not excluded but are deemed unnecessary. Graphitized carbon as used herein does not require that the carbon be graphitic. The carbon added to the negative electrode is to be present in the range of about 1–10 volume % of the electrode, preferably in the range of about 3–7 volume % of the electrode.

When Raney iron ($Al_5Fe_2$) is used in place of the graphitized carbon, it is preferred that the Raney iron be present in the range of about 3–10 volume % of the electrode.

Specifically, the preferred negative electrode has a lithium content in the range of about 5–50 at. % and an aluminum content in the range of from about 95-50 at. %. The negative electrode is formed of particulate mixture of lithium-aluminum alloy and the electrolyte, and a material selected from graphited carbon, an aluminum-iron alloy and mixtures thereof, the lithium-aluminum alloy being present in the range of about 45-80 volume % of the electrode, the electrolyte being present in an amount not less than about 10 volume % of the electrode, the graphitized carbon being present in the range of about 1-10 volume % of the electrode, and aluminum-iron alloy being present in the range of about 3-10 volume % of the electrode. The positive electrode comprised the active material of a chalcogen or a transition metal chalcogen.

In the fully charged state, the potential between the negative and the positive electrodes is approximately 1.30 volts. In the over-discharged state of a positive electrode limited cell, the potential between the lithium deposited in the positive electrode and the aluminum remaining in the negative electrode is about a negative 1.0 volts. This phenomena of reversing the polarity of the electric output is known as voltage reversal. The impact is quite evident in a multiple cell battery where if one cell is totally discharged and is driven beyond the 100% discharge range by the adjacent cells, the output voltage of the battery is then reduced by an amount greater than the voltage normally contributed by the defective cell when it otherwise was in good operating condition.

SUMMARY OF THE INVENTION

This invention relates to an improved lithium-aluminum/iron-sulfide electrochemical cell, where the negative electrode has less fully charged capacity by a predetermined factor than the fully charged capacity of the positive electrode, to the extent that the negative electrode becomes the limiting factor for the capacity of the entire cell.

This invention specifically provides in a preferred embodiment that the negative electrode is formed of the alloy of lithium-aluminum and an additive of graphitized carbon, Raney iron and/or magnesium oxide, and has a full discharge capacity in the range of only 50-100% of that of the positive electrode formed of iron-sulfide.

The improved lithium-aluminum/iron-sulfide electrochemical battery can be used in repetitive charge and deep discharge power cycles, the battery being formed of a plurality of individual electrochemical cells connected together, where the negative electrode of each cell is of a capacity of only 50-100% that of the positive electrode. This provides for more nearly uniform or flatter output power during deep discharge cycles up to the 75-90% level of discharge, allows for improved cell kinetics in that high discharge rates with high cell specific energy outputs are possible, and moreover minimizes the possibility of voltage reversal in the event that any individual malfunctioning cell is powered to even the 150% level of discharge.

DETAILED DESCRIPTION OF THE INVENTION

Figure 1:
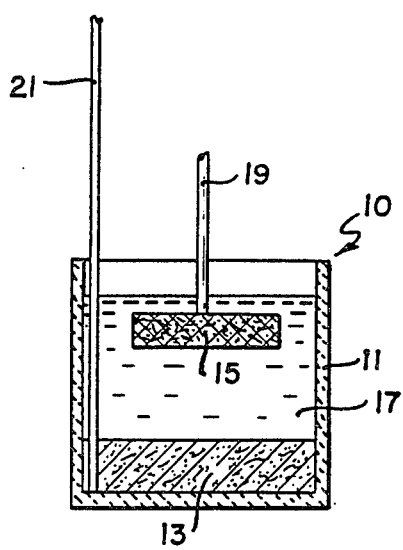
FIG. 1 is a schematic illustration of an electrochemical cell that can be used in testing the electrode composition of the invention.

FIG. 1 illustrates an electrochemical cell 10 suitable for testing electrodes of the present type, the cell 10 being disclosed also in my U.S. Pat. No. 4,011,374 issued March 8, 1977 and assigned to the assignee of this application, the disclosure of which patent is incorporated herein by reference. The cell 10 includes a nonconductive exterior housing 11, a negative electrode 13 and a positive electrode 15 separated by molten electrolyte 17. Electrode conductors 19 and 21 respectively extend from the positive electrode 15 and the negative electrode 13. Although schematic in nature, it will be understood that one skilled in the art can make an electrochemical cell 10 of the same general type to incorporate multiple layers of negative and positive electrodes separated by molten electrolyte, all with suitable support members, insulators and other items well known in the art.

Figure 2:
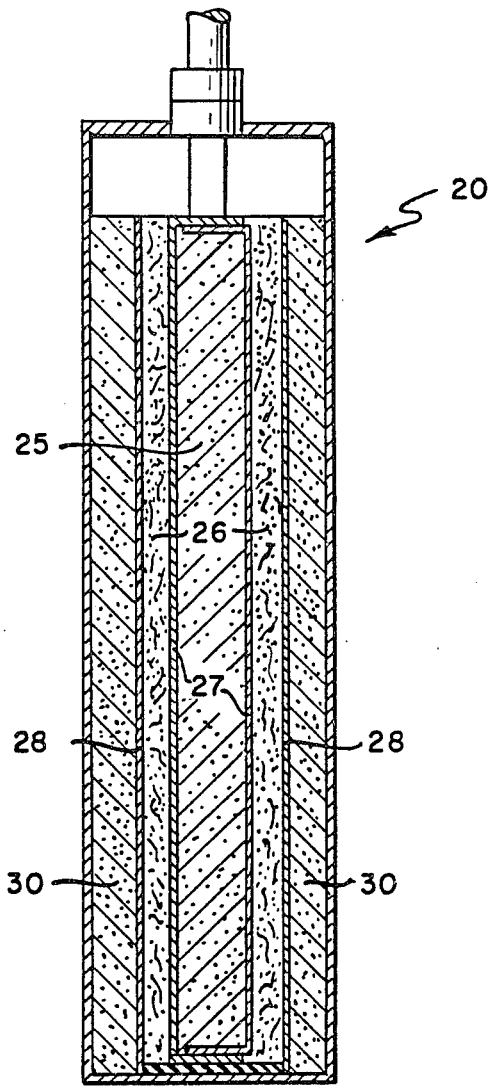
FIG. 2 is a schematic illustration of a special testing design for an electrochemical cell.

FIG. 2 illustrates a special test cell 20 of the type used to generate the data hereinafter reported. Because typical multiplate cells exhibit more electrode agglomeration for an inner negative electrode, that is an electrode operated with electrolyte at both faces, the test cell 20 incorporates such a design. The test cell 20 is positive grounded and has a center negative electrode 25, which may be cold pressed lithium-aluminum alloy (40 at. % lithium and 70 amp. hr. capacity) and which is surrounded by a boron nitride separator 26. Perforated iron current collectors 27 and 28 are respectively at the outer boundaries of the negative electrode 25 and at the inner boundaries of iron sulfide positive electrode 30. The perforated current collectors 27, 28 have apertures about 38 mils in diameter with 45% of each sheet being open area. The test cell 20 is designed with the positive electrode 30 having twice the capacity compared to the negative electrode 25, whereby the test cell 20 capacity is controlled by the negative electrode 25. The negative electrode 25 is heavily polarized, particularly at the end of discharge, all of these conditions being contrary to stable cell capacity in previous investigations.

The improved negative electrode composition and cell of the invention includes a lithium-aluminum alloy along with an additive in sufficient quantities to impart increased lithium alloy utilization and relatively stable and improved cell capacity during repeated deep discharge cycles.

The additive used herein are from the class consisting of graphitized carbon, Raney iron (the aluminum iron intermetallic $Al_5Fe_2$), or mixtures of graphitized carbon and Raney iron. Also, magnesium oxide (MgO) can be used as an additive. When the additive is graphitized carbon, it should be present in the range of about 1-10 volume % of the negative electrode and when the additive is Raney iron then it should be about 3-10 volume % of the negative electrode. Effective mixtures of graphitized carbon and Raney iron may be used in lieu of either the Raney iron or the graphitized carbon and the minimum amounts depend on the ratio of graphitized carbon to Raney iron, which is within the skill of the art. When magnesium oxide is used as the additive, it should be present in the range of about 3–5% volume % of the electrode.

Lithium in the range of about 5–50 at. % is added by direct contact or by electro-deposition into the aluminum to form the lithium-aluminum alloy. The lithium concentration is limited by its propensity to form molten phases with the alloy components at high temperatures and at high lithium concentrations. Fifty at. % lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic-based electrolytes containing lithium ions. The use of an additive graphitized carbon or Raney iron or mixtures thereof, or of magnesium oxide, provide lithium alloy utilization of about 80–85% and stable capacity. Increased capacities of up to about 40% compared to lithium-aluminum negative electrode without the additive have been observed.

In the past, negative electrode materials were prepared by various metallurgical techniques such as that disclosed in my U.S. Pat. No. 4,158,720 issued June 19, 1979, assigned to the assignee of the present invention, the disclosure of which is incorporated herein by reference. In that patent, the negative electrode was prepared by forming a molten alloy of iron and aluminum. The melt was formed at a temperature above the melting point of aluminum but below the melting point of iron. For the alloys contemplated in that patent, temperatures of 1200° C. or above were satisfactory. The melt was solidified and comminuted to particles of aluminum-iron alloy in the specified proportions. Thereafter, the alloy particles were integrated into a porous, electrically conductive substrate. This was achieved by compacting the particles together with a powdered electrolyte by vibtating or otherwise distributing the particles into a porous electrically conductive substrate or by bonding the particles in combination with thermal setting material to form a porous electrically conducted substrate. Other metallurgical techniques such as casting or extruding are also discussed.

The preferred method of making the negative electrode of this invention involves forming a slurry of the lithium-aluminum particles in a carrier inert to lithium alloys such as dry petroleum ether, toluene, kerosene, or the like such that the resultant slurry is a spreadable and extrudable paste. The preferred amount of organic carrier is about 30 volume %; however, the carrier may be present in an amount up to 50 volume % or be as low as 10 volume %, depending on particle size and desired viscosity.

If the inert carrier is present in an amount greater than 50 volume %, then the slurry becomes too runny and does not retain its shape upon extrusion and also the amount of heat required to drive off the solvent is greater and handling costs are greater. On the other hand, if less than about 10 volume % inert carrier is used to form the slurry, then the close packing and protective nature of the carrier is not obtained, and the method is not advantageous.

By selecting an inert carrier such as petroleum based liquids such as toluene, kerosene, mineral spirits and the like, several benefits are obtained. It has been found that in the slurry , a closer particle packing density is obtained when compared to dry powder packing, the method most commonly used to fabricate electrodes of the present type. Because the carrier apparently provides some lubricating properties, the irregularly shaped lithium-aluminum particles can be packed more densely than dry powder packing. Typically, lithium-aluminum dry packing results in 50% of theoretical density to give a loading density of about 0.7 amp-hours/cc which is marginal for producing high-specific-energy cells. The aforesaid inert hydrocarbon slurry technique enables a 0.9 amp-hour/cc loading density which is well suited for high-specific-energy cells. This technique gives loading densities about equal to the cold pressed lithium-aluminum electrode loading densities.

In addition to producing comparable electrode loading density to cold pressing, the slurry electrode fabrication technique provides considerable advantage in that the slurry technique is not limited to flat rectangularly shaped electrodes, as is cold pressing. When the slurry is extrudable it may be extruded to conform to advanced current collector design with irregularly shaped electrode terminals. This technique is not available when using cold pressing. For instance, cylindrical or annularly shaped electrodes can be formed by means of an extrudable slurry. In addition, the slurry technique accommodates active material which is very brittle, whereas cold pressing depends on material ductility to obtain the desired electrode loading density. Electrodes of greater than 48 at. % lithium-aluminum cannot be made by cold pressing because the lithium alloy particles are too brittle. However, the slurry technique does not depend on material ductility to obtain the desired electrode shape and, in addition, does not develop stresses within the electrode of the type that have resulted in bowing and warping of cold pressed electrodes.

A still further benefit of the slurry technique is that room temperature extrusion is possible because the inert petroleum carrier provides sufficient protection to allow the extrusion to take place under normal atmosphere conditions as opposed to the protective atmosphere which is now required for the dry packing technique.

A test cell 20 hereinafter identified as WR-3 was constructed according to the slurry method hereinbefore described using a negative electrode of 49 at. % lithium in the lithium-aluminum alloy, the allow being present in an amount equal to 87 volume % of the negative electrode, excluding the perforated sheet iron current collector. Also included in the electrode was 3 volume % graphitized carbon powder.

The graphitized carbon powder used preferably has a particle size in the range of from about +325 to about −200 U.S. Mesh Series. If Raney iron ($Al_5Fe_2$) is used as an additive, then the Raney iron preferably has a particle size of from about +325 to about −100 U.S. Mesh Series. If magnesium oxide (MgO) is used as an additive, then it preferably has particle size of from about +325 to about −200 U.S. Mesh Series.

Figure 3:
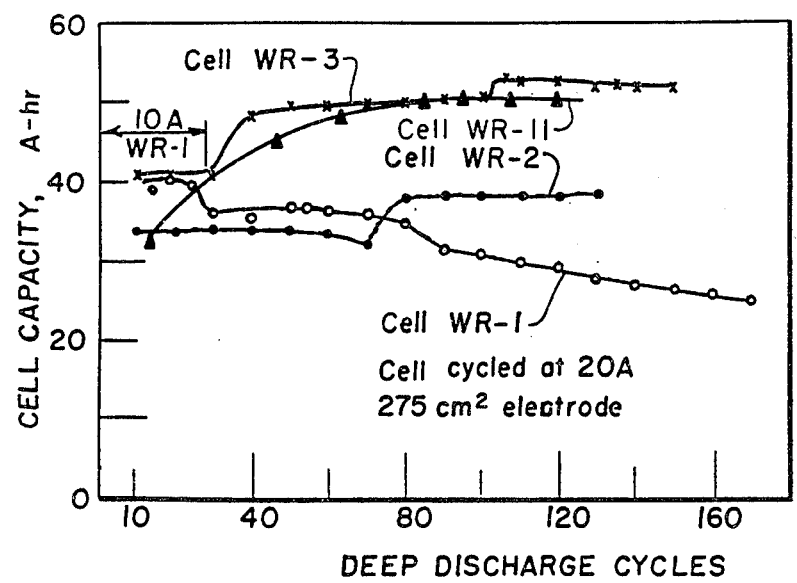
FIG. 3 is a graph showing the relationship between cell capacity in amp-hours and lithium alloy utilization with respect to deep discharge cycles for several negative electrodes.

Using a test cell as disclosed in FIG. 2 and a negative electrode having a 92.3 wt. % lithium-aluminum alloy and 7.7 wt. % graphitized carbon, the WR-3 negative electrode was constructed. This electrode had 65 amp-hours of lithium alloy capacity vs. 120 amp-hours of iron sulfide capacity in the positive electrode, whereby the lithiumn alloy electrode was the limiting factor of the cell couple. As illustrated in FIG. 3, the lithium-aluminum electrode with the graphitized carbon additive exhibited about 40% increased capacity compared to the WR-1 cell formulated with a lithium-aluminum negative electrode having no additive material. The WR-2 cell had a negative electrode of lithium-aluminum with a 5 volume % Raney iron ($Al_5Fe_2$) additive and although the WR-2 cell did not have as significantly improved capacity as the WR-3 cell, the WR-2 cell capacity was significantly improved over the WR-1 cell both in its lithium alloy utilization and its nondeclining cell capacity during deep discharge cycling. Even after 550 cycles the WR-2 cell with the Raney iron additive had better than 98+% coulombic efficiency and with about 0.027% capacity decline rate. The WR-11 cell had an additive of 3-5% magnesium oxide, and its capacity compared well (about a 40% improvement) against the WR-1 cell formulated with no additive material.

Examination of the WR-3 cell after 186 cycles determined it had a 99% coulombic efficiency. Although some areas of agglomeration were seen at the electrode center, the graphitized carbon powder tended to break up the densified area, and further, each carbon particle retained an electrolyte film, whereby these areas were electrochemically active. Examination of the WR-3 cell found no lithium-aluminum carbon phase in the cell, whereby it is assumed that the carbon remains discrete. Not only did the WR-3 cell have a 40% improved capacity with respect to the WR-1 cell, but the capacity of the WR-3 cell did not decline during deep discharge cycles and unexpectedly increased at the freeze-thaw cycle.

The present negative electrode 25 is a significant improvement with respect to negative electrodes incorporating various resins as binders since the chemicals in resin binders tend to react with the lithium-aluminum to diminish the electrochemical capacity of the negative electrode. Typically, the binder resins evolve water, hydrogen, oxygen, nitrogen, methane and other components during pyrolysis which react with the lithium in the negative electrode forming the oxides, the hydroxides and the nitrides to reduce the lithium capacity, all of which is deleterious to cell performance.

It is apparent that a major problem in the development of the lithium-aluminum/iron sulfide cell has been solved by the subject invention. In the past, the lithium-aluminum/iron sulfide cells had a marked decline in capacity during deep discharge cycling. Previously it had been found that it was found necessary to limit the capacity of the cell with the positive electrode, the lithium-aluminum electrode could only be utilized to less than about 65% of theoretical capacity, in order to obtain stable cell-capacity relationship. However, with the lithium-aluminum alloy having the additive of the present invention formulated into a negative electrode, the cell can be made to operate with the negative electrode limiting the discharge capacity of the cell and discharge utilizations of about 82% theoretical capacity have been achieved without declining cell capacity during deep discharge cycling. It is believed that the disclosed additives suppress the agglomeration processes which degrades conventional lithium-aluminum electrodes during deep discharge cycling.

Figure 4:
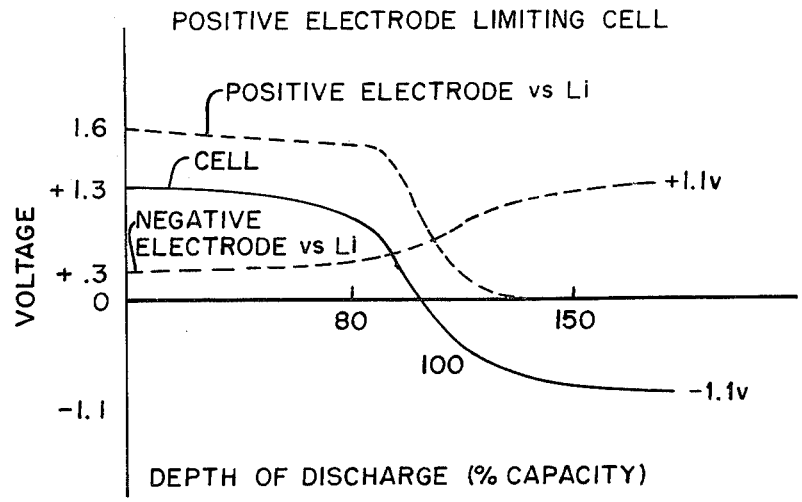
FIGS. 4 and 5 are graphs respectively showing the relationship between the potential in volts of the positive and negative electrodes referenced against elemental lithium and of the cell itself, of the positive electrode limiting cell design used in the prior art and the negative electrode limiting cell design used in this invention.
Figure 5:
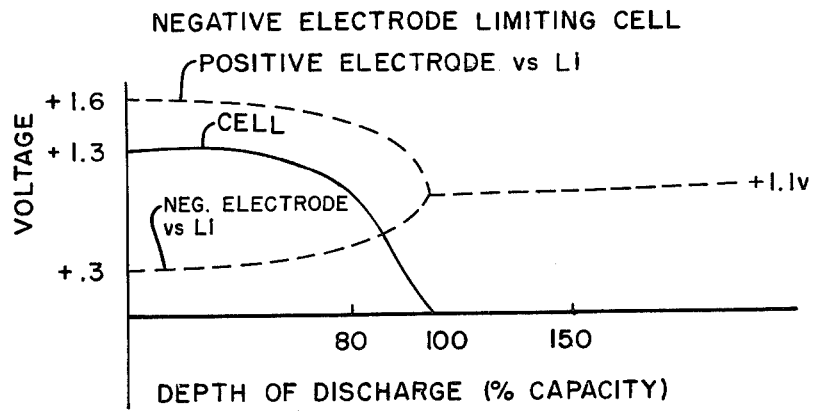

As is illustrated in FIGS. 4 and 5, in the fully charged state, the potential between the positive electrode (FeS) and elemental lithium ($Li^\circ$) as a reference is approximately +1.6 volt, while the potential between the negative electrode (LiAl) and the reference elemental lithium ($Li^\circ$) is approximately +0.3 volt, for a net potential when the electrodes are in a common cell of 1.3 volts. As either electrode discharges to less than the fully charged value, the internal resistance of the electrode begins to increase, the positive electrode dramatically and the negative electrode to a lesser extent. The cell power capability likewise drops off dramatically. At approximately 100% depth of discharge, the potential between the positive electrode ($Li_2S+Fe$) and the reference lithium is reduced to approximately +0.4 volt. If the positive electrode is overdischarged or powered beyond the 100% state of discharge, such as by having the cell connected between adjacent like cells yet at high or fully charged potential, lithium ($Li^\circ$) forms therein and the output of the positive electrodes goes to zero (Li vs. Li).

On the other hand, the negative electrode (LiAl), during cell discharge, has an output potential relative to the lithium ($Li^\circ$) that charges very little (20-30%) from approximately +0.3 volt when fully charged to approximately +0.4 volt at the 100% depth of discharge value. In the over-discharge level, the negative electrode is reduced to aluminum (Al), which referenced to the lithium (Li) produce a potential of approximately +1.1 volt at the 150% depth of discharge value.

In a conventional positive electrode limited cell design (see FIG. 4), the zero volt potential of the positive electrode and the +1.1 volt potential of the negative electrode causes a voltage reversal between the electrodes, from +1.3 volts to −1.1 volts. This voltage shift of 2.4 volts across the electrodes, between the fully charged condition and the 150% depth of discharge condition, is more than the output potential contributed by the fully charged cell.

This invention designs the fully charged capacity of the negative electrode between 0.5-1.0 that of the positive electrode, and the negative electrode thus becomes the limiting factor in the overall cell capacity. With this construction, if the cell is powered beyond 100% discharge capacity, the negative electrode will limit the cell capacity and the positive electrode is not driven to high depths of discharge. The effective cell output voltage (see FIG. 5) does not go negative at even the 150% depth of discharge level of the negative electrode limited call, where the potential of the positive electrode ($Li_2S+Fe$ vs. Li) balances the potential of the negative electrode (Al vs. Li) to have zero output voltage. In the extreme case where the positive electrode is driven to incorporate aluminum (Al), the positive electrode then has the same reference potential as the negative electrode (Al vs. Li). Thus, the voltage reversal phenomena that would normally occur in a multiple cell lithium-aluminum/iron-sulfide battery is virtually eliminated.

As the voltage reversal phenomena generates excess heat which decreases the life of the battery, the elimination of this phenomena in a battery construction allows for a longer life battery. The battery moreover has a flatter internal cell resistance throughout discharge so that greater output power is available throughout discharge and even at the 80% discharge condition of the battery.

By way of specific example, an engineering test cell LCMP-17 was fabricated with 0.84 negative to positive electrode capacity ratio (340 A hr. LiAl vs. 400 A hr. FeS), or 19% excess capacity of the positive electrode, so that the negative electrode was limiting in this cell. Tests conducted at discharge rates of 75 m A/cm$^2$ (a four-hour discharge rate for this cell) and at 100 m A/cm$^2$ (a three-hour discharge rate) provided that the negative electrode limited cell retained 96.3% of its four-hour test capacity for the three-hour discharge tests, while the positive electrode limited cell LCMP-16 retained about 85% of its four-hour capacity at the three-hour discharge rate. Moreover, the improved cell LCMP-17 had substantially greater power output (321 watts vs. 189 watts) at 80% depth of discharge when compared to the positive limited cell LCMP-16. The invention further allows the electrodes to be made thicker, such as having 1.1 cm thick negative electrodes vs. the more typical 0.6–0.8 cm thick negative electrodes of the positive electrode limited design. The test cell LCMP-17 with the thicker electrode design provided increased specific cell energy density of 100 W hr./Kg. vs. the more typical density of 85 W hr./Kg.

The negative electrode limiting characteristic of the battery will have application in any pressed or slurry-formed lithium aluminum or lithium alloy electrode, even without the carbon or the Raney iron additive (as taught in the parent application), or without an additive of magnesium oxide (MgO) as further disclosed herein.

The disclosed negative electrode limiting design, however, has particular importance with the battery construction having the additive of graphitized carbon, Raney iron, or magnesium oxide included in the negative electrode, in that agglomeration of the electrode material is minimized and little degradation per charging cycle occurs so that nearly the fully charged potential is available for repetitive charges.

It can be seen from the foregoing, that the present invention provides an improved negative electrode composition for use in electrochemical cells. The additive material in the negative electrode is such that it maintains stable electrode capacity during deep discharge cycles and provides vastly improved electrode utilization.

Further, the battery designed with cells each having the positive electrode of significantly greater (1.0–1.5 times) capacity than the corresponding negative electrode, viz., making the cells negative electrode limited, unexpectedly gives longer new full capacity output for the complete series of charge-discharge cycles of the battery and substantially greater power capability at 80% depth of discharge.

The embodiments of the invention in which an exclusive property or privilege is claimed are defined as follows:

1. A secondary electrochemical cell having a negative electrode of lithium aluminum, a positive electrode of iron sulfide, a molten electrolyte of lithium chloride and potassium chloride, the combination therewith of the negative and positive electrodes having quantities of the respective materials forming same in such proportions that the full charge theoretical capacity of the negative electrode being in the range of 0.5–1.0 of the full charge theoretical capacity of the positive electrode, whereby the cell capacity is limited by the negative electrode capacity during discharge cycling, and the negative electrode containing in the approximate range of 1–10 volume % of the electrode an additive from the group of materials including graphitized carbon, Raney iron and magnesium oxide.

2. A secondary electrochemical cell according to claim 1, wherein the negative electrode contains in the approximate range of 45–80 volume % of lithium aluminum alloy and not less than about 10 volume % of electrolyte.

3. A secondary electrochemical cell comprising a positive electrode and a negative electrode and an electrolyte, said positive electrode comprising an active material of a chalcogan or a transition metal chalcogan, said negative electrode comprising a particulate mixture of lithium-aluminate alloy and electrolyte, said lithium-aluminum alloy being present in the range of about 45 to 80 percent by volume of the negative electrode, said electrolyte during cell operation being molten and being present in an amount not less than about 10 percent by volume of the negative electrode, said electrolyte containing lithium ions and providing ionic communication between said positive and negative electrodes, the negative electrode at full charge conditions having a theoretical capacity in the range of 0.5–1.0 the theoretical capacity of the positive electrode, whereby the cell capacity is negative electrode limited during discharge cycling, and the negative electrode containing in the approximate range of 1–10 volume % of the electrode an additive from materials including graphitized carbon, an aluminum-iron alloy, and magnesium oxide, or mixtures thereof.

4. A secondary electrochemical battery design according to claim 3, wherein graphitized carbon is present in the range of about 1 to 10 percent by volume of the negative electrode.

5. A secondary electrochemical cell according to claim 3, wherein aluminum-iron alloy is present in the range of from about 3 to 10 percent by volume of the negative electrode.

6. The secondary electrochemical cell according to claim 3, wherein the active material in said positive electrode is an iron sulfide.

7. The secondary electrochemical cell according to claim 3, wherein said lithium-aluminum alloy contains lithium in the range of about 5 to 50 atom percent and aluminum in the range of from about 95 to 50 atom percent.

8. The secondary electrochemical cell according to claim 3, wherein said lithium-aluminum alloy is present in an amount not less than about 49 percent by volume of the negative electrode.

9. The secondary electrochemical cell according to claim 3, wherein said electrolyte is the eutectic mixture of lithium chloride and potassium chloride.

10. The secondary electrochemical cell according to claim 3, wherein graphitized carbon is present in the negative electrode in the range of about 3 to 7 percent by volume.

11. The secondary electrochemical cell of claim 1, wherein said graphitized carbon is produced by heating carbon powder to a temperature in the range of about 1000° C. to 2000° C.

12. The secondary electrochemical cell according to claim 10, wherein said graphitized carbon originated in a particulate mixture having a particle size in the range of about +325 to −200 U.S. Mesh Series.

13. The secondary electrochemical cell according to claim 3, wherein aluminum-iron alloy is present in the negative electrode in the intermetallic phase $Al_5Fe_2$.

14. The secondary electrochemical cell according to claim 13, wherein said $Al_5Fe_2$ originated in a particulate mixture having a particle size in the range of about +325 to −100 U.S. Mesh Series.

15. The secondary electrochemical cell according to claim 3, wherein said electrolyte is the eutectic mixture of lithium chloride and potassium chloride.

16. The secondary electrochemical cell according to claim 3, wherein magnesium oxide is present in the negative electrode in the range of about 3 to 5 percent by volume.

17. The secondary electrochemical cell according to claim 16, wherein said magnesium oxide originated in the particulate mixture having a particle size in the range of about −325 to −200 U.S. Mesh Series.

* * * * *